(12) United States Patent
Clapper et al.

(10) Patent No.: US 10,035,328 B2
(45) Date of Patent: Jul. 31, 2018

(54) LIQUID OPTICAL ADHESIVE COMPOSITIONS

(71) Applicant: 3M INNOVATIVE PROPERTIES COMPANY, St. Paul (MN)

(72) Inventors: Jason D. Clapper, Lino Lakes, MN (US); Serkan Yurt, St. Paul, MN (US); Christopher J. Campbell, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 198 days.

(21) Appl. No.: 15/034,293

(22) PCT Filed: Nov. 13, 2014

(86) PCT No.: PCT/US2014/065400
§ 371 (c)(1),
(2) Date: May 4, 2016

(87) PCT Pub. No.: WO2015/077114
PCT Pub. Date: May 28, 2015

(65) Prior Publication Data
US 2016/0289515 A1  Oct. 6, 2016

Related U.S. Application Data

(60) Provisional application No. 61/906,919, filed on Nov. 21, 2013.

(51) Int. Cl.
| | |
|---|---|
| B32B 7/12 | (2006.01) |
| C09J 4/06 | (2006.01) |
| C09J 133/06 | (2006.01) |
| G02F 1/1335 | (2006.01) |
| B32B 23/04 | (2006.01) |
| B32B 23/08 | (2006.01) |
| B32B 27/08 | (2006.01) |
| B32B 27/30 | (2006.01) |
| B32B 27/36 | (2006.01) |
| C08K 3/22 | (2006.01) |

(52) U.S. Cl.
CPC ............... *B32B 7/12* (2013.01); *B32B 23/04* (2013.01); *B32B 23/08* (2013.01); *B32B 27/08* (2013.01); *B32B 27/308* (2013.01); *B32B 27/36* (2013.01); *B32B 27/365* (2013.01); *C09J 4/06* (2013.01); *C09J 133/066* (2013.01); *G02F 1/133528* (2013.01); *B32B 2255/26* (2013.01); *B32B 2307/412* (2013.01); *B32B 2307/416* (2013.01); *B32B 2307/42* (2013.01); *B32B 2307/732* (2013.01); *B32B 2419/00* (2013.01); *B32B 2457/20* (2013.01); *B32B 2551/00* (2013.01); *C08K 3/22* (2013.01); *C08K 2201/011* (2013.01); *G02F 2202/28* (2013.01)

(58) Field of Classification Search
CPC .................................................. C09J 133/066
See application file for complete search history.

(56) References Cited

U.S. PATENT DOCUMENTS

| | | | |
|---|---|---|---|
| 4,659,788 A | 4/1987 | Ohta | |
| 6,448,301 B1 | 9/2002 | Gaddam | |
| 6,664,306 B2 | 12/2003 | Gaddam | |
| 7,005,143 B2 | 2/2006 | Abuelyaman | |
| 7,691,437 B2 | 4/2010 | Ellis | |
| 7,767,728 B2 | 8/2010 | Lu | |
| 8,137,807 B2 | 3/2012 | Clapper | |
| 8,468,712 B2 | 6/2013 | Nguyen | |
| 9,309,443 B2 * | 4/2016 | Yurt | C09J 4/06 |
| 2004/0127594 A1 * | 7/2004 | Yang | C08F 290/061 |
| | | | 522/114 |
| 2007/0191506 A1 | 8/2007 | Lu | |
| 2009/0283211 A1 | 11/2009 | Matsuhira | |
| 2010/0029059 A1 | 2/2010 | Matsumura | |
| 2010/0086705 A1 | 4/2010 | Everaerts | |
| 2010/0086706 A1 | 4/2010 | Everaerts | |
| 2010/0118245 A1 | 5/2010 | Toyoda | |
| 2011/0021655 A1 | 1/2011 | Smothers | |
| 2011/0033720 A1 | 2/2011 | Fujita | |
| 2012/0115976 A1 | 5/2012 | Igarashi | |
| 2013/0011683 A1 | 1/2013 | Busman | |
| 2013/0034713 A1 | 2/2013 | Busman | |

FOREIGN PATENT DOCUMENTS

| | | |
|---|---|---|
| JP | 2008-195753 | 8/2008 |
| WO | WO 2000-009619 | 2/2000 |
| WO | WO 2010-027041 | 3/2010 |
| WO | WO 2012/024217 | 2/2012 |
| WO | WO 2012/077806 | 6/2012 |
| WO | WO 2013/092573 | 6/2013 |
| WO | WO 2013-181030 | 12/2013 |
| WO | WO 2014-093014 | 6/2014 |
| WO | WO 2015-077161 | 5/2015 |

OTHER PUBLICATIONS

International Search Report for PCT International Application No. PCT/2014/065400, dated Feb. 6, 2015, 3 pgs.

* cited by examiner

*Primary Examiner* — Ramsey E Zacharia
(74) *Attorney, Agent, or Firm* — Kent S. Kokko

(57) ABSTRACT

The disclosure describes a curable composition comprising a) a solute (meth) acryloyl oligomer having a plurality of pendent, ethylenically unsaturated, free-radically polymerizable functional groups and nucleophilic, hydrophilic groups, a $M_w$ of 5 k to 30 k. a $T_g<20°$ C.; b) a solvent monomer component; and non-reactive oligomer an a photoinitiator. The curable composition may be used as an adhesive in optical applications.

21 Claims, No Drawings

LIQUID OPTICAL ADHESIVE COMPOSITIONS

CROSS REFERENCE TO RELATED APPLICATIONS

This application is a national stage filing under 35 U.S.C. 371 of PCT/US2014/065400, filed Nov. 13, 2014, which claims the benefit of U.S. Application No. 61/906,919, filed Nov. 21, 2013, the disclosure of which is incorporated by reference in its/their entirety herein.

FIELD

The present disclosure relates to optically clear adhesives and laminates that include the adhesives.

BACKGROUND

Optically clear adhesives are finding wide applications in optical displays. Such applications include bonding polarizers to modules of a liquid crystal display (LCD) and attaching various optical films to a glass lens in, for example, mobile hand held (MHH) devices. During use, the display can be subjected to various environmental conditions, such as high temperature and/or high humidity.

It has been observed that adhesives can exhibit failures under these conditions that include bubbling within the adhesive layer as well as delamination between the optical adhesive and components of the laminate display assembly. It is expected that by improving the adhesive bond between the adhesive and the laminate components, the likelihood of these types of failure during environmental testing conditions will decrease.

SUMMARY

The present disclosure includes a curable composition comprising a) a reactive solute (meth)acryloyl oligomer having a plurality of pendent, ethylenically unsaturated, free-radically polymerizable functional groups and pendent hydroxyl groups, a $M_w$ of 5 k to 30 k, a $T_g$<20° C. (preferably having a $T_g$<0+ C.); b) a solvent monomer component; c) a non-reactive oligomer, and d) a photoinitiator.

The composition, when cured, is non-yellowing, exhibits low shrinkage, low birefringence and low sensitivity to moisture (cloud point-resistant), making it suitable for many optical applications including, but not limited to bonding polarizers to modules of a liquid crystal display (LCD) and attaching various optical films to a glass lens in, for example, mobile hand held (MHH) devices. The composition is low viscosity so that it may be used as a dispensable optical adhesive, and builds molecular weight by a chain-growth addition process.

In one aspect, an optically clear laminate is provided that includes a first substrate having at least one major surface, a second substrate having at least one major surface, and the cured optical adhesive composition disposed between the two substrates. The articles of the disclosure, and the adhesives layers thereof, may have a thickness greater than about 0.5 millimeters, generally a birefringence (absolute) of less than $1\times10^{-6}$, average light transmission (over the range of 350-800 nm) greater than about 85%, preferably greater than 90%, and a CIELAB b* less than about 1.5 units, preferably less than about 1.0 unit for samples with thickness of 500 microns.

In a further aspect, an optically clear laminate is provided that includes a first substrate having at least one major surface, a second substrate having at least one major surface, and a cloud point-resistant, optically clear adhesive composition situated between and in contact with at least one major surface of the first substrate and at least one major surface of the second substrate, wherein the adhesive has a moisture-vapor transmission rate a at least 400 $g/m^2/day$.

By incorporating hydrophilic moieties in the liquid optical adhesive matrix, haze-free, cloud point-resistant adhesives can be obtained which remain clear even after high temperature/humidity accelerated aging tests. The provided adhesives are suitable for use in, for example, laminating polarizers to optical LCDs, attaching various optical films to glass lenses in mobile handheld devices, and other adhesive application that require optical clarity in various temperature and humidity environments.

Although not wishing to be bound by theory, it is thought that the haze appears when the adhesive becomes saturated with water at elevated temperatures and the concentration of water exceeds the cloud point, due to poor compatibility of the moisture with the adhesive matrix, when the adhesive is quickly cooled. This can result in phase separation of small water droplets, which due to a mismatch in refractive index with the adhesive matrix causes haze or a "white" appearance. If the droplets remain very small (e.g., a few hundred nanometers or less) or the water remains fully solubilized in the adhesive under ambient conditions, the adhesive and its bond line with the substrate will stay clear while the adhesive re-equilibrates its moisture content with the environment. To facilitate re-equilibration of the moisture with its environment, it is also anticipated that the moisture-vapor transmission rate of the adhesive needs to be high enough to transport the water at a sufficiently high rate to prevent water accumulation which may lead to light scattering and haze.

As used herein:

"cloud point" refers to the temperature at which a mixture of adhesive and water separate into a continuous adhesive phase and a dispersed water phase, where the dispersed phase is larger than the wavelength of light and thus make the adhesive appear "white" or cloudy;

"Alkyl" means a linear or branched, cyclic or acyclic, saturated monovalent hydrocarbon having from one to about 32, e.g., methyl, ethyl, 1-propyl, 2-propyl, pentyl, and the like.

"Alkylene" means a linear saturated divalent hydrocarbon having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Heteroalkyl" includes both straight-chained, branched, and cyclic alkyl groups with one or more heteroatoms independently selected from S, P, Si, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent, i.e. monovalent heteroalkyl or polyvalent heteroalkylene.

"Aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is an aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent, i.e. monovalent aryl or polyvalent arylene.

"(Hetero)hydrocarbyl" is inclusive of hydrocarbyl alkyl and aryl groups, and heterohydrocarbyl heteroalkyl and heteroaryl groups, the later comprising one or more catenary oxygen heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

"acryloyl" is inclusive of both esters and amides.

"(meth)acryloyl" includes both acryloyl and methacryloyl groups; i.e. is inclusive of both esters and amides.

DETAILED DESCRIPTION

As a first component, the adhesive composition has a) a reactive solute meth)acryolyl oligomer having a $M_w$ of 5 to 30 k, preferably 8 to 15 k, and a $T_g$ of <20° C., preferably <10° C., more preferably <0° C., b) a solvent diluent monomer component, c) a non-reactive (meth)acryloyl oligomer and d) a photoinitiator. In some embodiments the composition comprises:
  a) greater than 50 parts by weight, preferably greater than 80 parts and most preferably greater than 90 parts of an oligomer having a plurality of pendent free-radically polymerizable functional groups and having a $M_w$ of 5 to 30 K and $T_g$ of <20° C.;
  b) less than 50 parts by weight, preferably less than 20 parts, and most preferably less than 10 parts of a diluent solvent monomer component;
  c) 1 to about 20 parts; preferably 1 parts to about 10 parts, more preferably 1 to 5 parts of a non-reactive oligomer based on 100 parts by weight of the total monomers plus reactive oligomer (a)+b)), and
  d) 0.001 to 5 parts by weight, preferably 0.001 to 1, most preferably 0.01 to 0.1 parts of a photoinitiator, based on 100 parts by weight of the oligomer and diluent solvent monomer.

The reactive oligomer generally comprises polymerized monomer units of:
  a) greater than 50 parts by weight, preferably greater than 75 parts by weight, most preferably greater than 80 parts by weight of (meth)acrylate ester monomer units;
  b) 10 to 49 parts by weight, preferably 10 to 35 parts by weight, most preferably 15 to 25 parts by weight, of monomer units having a pendent hydroxy functional group.
  c) 1 to 10 parts by weight, preferably 1 to 5 parts by weight, most preferably 1 to 3 parts by weight, of monomer units having a pendent, free-radically polymerizable functional groups.
  d) 0 to 30, preferably 0 to 20 parts by weight of other polar monomer units,
  e) 0 to 10 parts by weight of a silane-functional monomer units,
  wherein the sum of the monomer units is 100 parts by weight.

In one aspect, the reactive oligomer comprises (meth)acrylate ester monomer units, (meth)acrylate ester can include aliphatic, cycloaliphatic, or aromatic alkyl groups. Useful alkyl acrylates (i.e., acrylic acid alkyl ester monomers) include linear or branched monofunctional acrylates or methacrylates of non-tertiary alkyl alcohols.

Useful monomers include, for example, 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, isononyl (meth)acrylate, n-butyl (meth)acrylate, isobutyl (meth)acrylate, hexyl (meth)acrylate, n-nonyl (meth)acrylate, isoamyl (meth)acrylate, n-decyl (meth)acrylate, isodecyl (meth)acrylate, lauryl(meth)acrylate, dodecyl (meth)acrylate, cyclohexyl (meth)acrylate, phenyl meth (acrylate), benzyl meth(acrylate), tridecyl (meth)acrylate, 2-propylheptyl (meth)acrylate and 2-methylbutyl (meth)acrylate, and combinations thereof. In some embodiments, the average carbon number of the alkanol portion of the (meth)acrylates is 10 to 14.

The reactive oligomer has a $T_g$ of <20° C., preferably <10° C., more preferably <0° C. A useful predictor of interpolymer $T_g$ for specific combinations of various monomers can be computed by application of Fox Equation: $1/T_g=\Sigma Wi/T_gi$. In this equation, $T_g$ is the glass transition temperature of the mixture, Wi is the weight fraction of component i in the mixture, and $T_gi$ is the glass transition temperature of component i, when polymerized as a homopolymer, and all glass transition temperatures are in Kelvin (K). In order that the oligomer have a $T_g$<20° C., it is expedient to include low $T_g$ monomers.

As used herein the term "low $T_g$ monomer" refers to a monomer, which when homopolymerized, produce a (meth)acryloyl copolymer having a $T_g$ of <20° C. The incorporation of the low $T_g$ monomer to the oligomer is sufficient to reduce the glass transition temperature of the resulting copolymer to <20° C., as calculated using the Fox Equation. Alternatively, the glass transition temperature can be measured in a variety of known ways, including, e.g., through differential scanning calorimetry (DSC).

Suitable low $T_g$ monomers have one ethylenically unsaturated group and a glass transition temperature of less than 20° C., preferably less than 10° C., (as estimated by the Fox Equation), which are suitable in the present disclosure include, for example, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxy-polyethylenglycol-monomethacrylate, laurylacrylate, tetrahydrofurfuryl-acrylate, ethoxyethoxyethyl acrylate and ethoxylated-nonylacrylate. Especially preferred are 2-ethyl-hexylacrylate, ethoxyethoxyethyl acrylate, tridecylacrylate and ethoxylated nonylacrylate.

In some embodiments the (meth)acrylic acid ester monomer component may comprise (meth)acrylate esters of 2-alkyl alkanols wherein the molar carbon number average of said 2-alkyl alkanols is 12 to 32. The Guerbet alkanol-derived (meth)acrylic monomers have the ability to form (co)polymers with unique and improved properties over comparable, commonly used adhesive acrylate (co)polymers. These properties include a very low $T_g$, a low solubility parameter for acrylic polymers, and a low storage modulus creating a very conformable elastomer. When Guerbet monomers are included, the (meth)acrylate ester component may include up to 100 parts by weight, preferably up to 50 parts by weight of the (meth)acrylate ester monomer component. Such Guerbet (meth)acrylate esters are described in U.S. Pat. No. 8,137,807 (Lewandowski et al.) and is incorporated herein by reference.

In some preferred embodiments, the (meth)acrylate ester is derived from alkanols having an average carbon number of $C_8$-$C_{32}$, preferably $C_8$-$C_{14}$. This average carbon number may be calculated based on the weight percentages of each (meth)acrylate ester monomer.

The reactive oligomer further comprises a hydrophilic, hydroxyl functional monomer, including hydroxyalkyl (meth)acrylates. The hydrophilic, hydroxyl functional monomeric compound typically has a hydroxyl equivalent weight of less than 400. The hydroxyl equivalent molecular weight is defined as the molecular weight of the monomeric compound divided by the number of hydroxyl groups in the monomeric compound The hydroxyl functional monomer has the general formula:

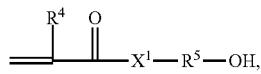

wherein
$R^5$ is a hydrocarbyl group, including alkylene, arylene and combinations thereof, more preferably a $C_1$-$C_6$ alkylene;
$R^4$ is —H or $C_1$-$C_4$ alkyl; and
$X^1$ is —$NR^4$— or —O—.

Useful monomers of this type include hydroxyethyl (meth)acrylate, 2- and 3-hydroxypropyl (meth)acrylate, 2-hydroxy-2-phenoxypropyl (meth)acrylate, and hydroxybutyl (meth)acrylate, 2-hydroxyethylacrylamide, and N-hydroxypropylacrylamide.

The hydroxyl functional monomer is generally used in amounts of 10 to 49 parts by weight based upon 100 parts total monomers of the oligomer.

The reactive oligomer optionally further comprises a polymerizable, hydrophilic polar monomer, other than the hydroxyl-functional monomer. The hydrophilic monomer typically has a average molecular weight ($M_n$) of greater than about 70, or than about 500, or even higher. The combination of poly(ethylene oxide) and hydroxyl functionality in the polymer needs to be high enough to make the resulting polymer hydrophilic. By "hydrophilic" it is meant that the poly compound can incorporate at least 25 weight percent of water without phase separation.

Typically, suitable hydrophilic polymerizable compounds may contain poly(ethylene oxide) segments that include at least 10, at least 20, even at least 30 ethylene oxide units. Alternatively, suitable hydrophilic polymeric compounds include at least 25 weight percent of oxygen in the form of ethylene glycol groups from poly(ethylene oxide) or hydroxyl functionality based upon the hydrocarbon content of the polymer.

Useful hydrophilic polymer compounds may be copolymerizable or non-copolymerizable with the adhesive composition, as long as they remain miscible with the adhesive and yield an optically clear adhesive composition. Copolymerizable, hydrophilic polymer compounds include, for example, CD552, available from Sartomer Company, Exton, Pa., which is a monofunctional methoxylated polyethylene glycol (550) methacrylate, or SR9036, also available from Sartomer, that is an ethoxylated bisphenol A dimethacrylate that has 30 polymerized ethylene oxide groups between the bisphenol A moiety and each methacrylate group. Other examples include phenoxypolyethylene glycol acrylate available from Jarchem Industries Inc., Newark, N.J.

The polar monomer component may also include weakly polar monomers such as acrylic monomer containing carboxylic acid, amide, urethane, or urea functional group. Useful carboxylic acids include acrylic acid and methacrylic acid. Useful amides include N-vinyl caprolactam, N-vinyl pyrrolidone, (meth)acrylamide, N-methyl (meth)acrylamide, N,N-dimethyl acrylamide, N,N-dimethyl meth(acrylamide), and N-octyl (meth)acrylamide.

The hydroxyl functional monomer and polar monomers are used in amounts such that the oligomer is hydrophilic. By "hydrophilic" it is meant that the oligomeric compound can incorporate at least 25 weight percent of water without phase separation. Generally the polar monomer are used in amounts of 0 to 20 parts, based on 100 parts total monomer of the oligomer. Generally the polar monomer, when present is used in amounts of 1 to 10 parts, preferably 1 to 5 parts.

The reactive oligomer optionally contains silane monomers [$M^{Silane}$] including those with the following formula:

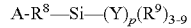

wherein:
A is an ethylenically unsaturated polymerizable group, including vinyl, allyl, vinyloxy, allyloxy, and (meth)acryloyl, preferably (meth acrylate;
$R^8$ is a covalent bond or a divalent (hetero)hydrocarbyl group.

In one embodiment $R^8$ is a divalent hydrocarbon bridging group of about 1 to 20 carbon atoms, including alkylene and arylene and combinations thereof, optionally including in the backbone 1 to 5 moieties selected from the group consisting of —O—, —C(O)—, —S—, —$SO_2$— and —$NR^1$— groups (and combinations thereof such as —C(O)—O—), wherein $R^1$ is hydrogen, or a $C_1$-$C_4$ alkyl group. In another embodiment, $R^8$ is a poly(alkylene oxide) moiety of the formula —$(OCH_2CH_2$—$)_f(OCH_2CH(R^1))_g$—, wherein f is at least 5, g may be 0, and preferably at least 1, and the mole ratio of f:g is at least 2:1 (preferably at least 3:1), and $R^1$ is H or a $C_1$-$C_4$ alkyl.

Preferably, $R^8$ is a divalent alkylene, Y is a hydrolysable group, including alkoxy, acyloxy and halo; $R^9$ is a monovalent alkyl or aryl group, p is 1, 2 or 3, preferably 3.

Useful silane monomers include, for example, 3-(methacryloyloxy) propyltrimethoxysilane, 3-acryloxypropyltrimethoxysilane, 3-acryloyloxypropyltriethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)propyldiethylethoxysilane, vinyldimethylethoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, and mixtures thereof.

The optional silane monomers [$M^{Sil}$] are used in amounts of 0 to 10, preferably 1-5, parts by weight, relative to 100 parts by weight total monomer. Such optional silane monomers are used as adhesion promoters for improved bonding to metal, to siliceous surfaces, to surfaces having —OH groups, or as a self-crosslinking group for the curable composition.

The reactive oligomer further comprises polymerized monomer units having a pendent ethylenically unsaturated polymerizable group. The ethylenically unsaturated group is provided to the oligomer by an indirect route whereby a portion of the pendent hydroxyl groups of the oligomer are further functionalized by reaction with a co-reactive, electrophilic compound having an ethylenically unsaturated group—"co-reactive monomers".

The co-reactive functional group preferably comprises a carboxyl, isocyanato, epoxy, anhydride, or oxazolinyl group, oxazolinyl compounds such as 2-ethenyl-1,3-oxazolin-5-one and 2-propenyl-4,4-dimethyl-1,3-oxazolin-5-one; carboxy-substituted compounds such as (meth)acrylic acid and 4-carboxybenzyl (meth)acrylate; isocyanato-substituted compounds such as isocyanatoethyl (meth)acrylate and 4-isocyanatocyclohexyl (meth)acrylate; epoxy-substituted compounds such as glycidyl (meth)acrylate; aziridinyl-substituted compounds such as N-acryloylaziridine and 1-(2-propenyl)-aziridine; and acryloyl halides such as (meth)acryloyl chloride.

Preferred co-reactive monomers have the general formula

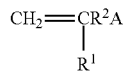

wherein $R^1$ is hydrogen, a $C_1$ to $C_4$ alkyl group, or a phenyl group, preferably hydrogen or a methyl group; $R^2$ is a single bond or a (hetero)hydrocarbyl divalent linking group that joins an ethylenically unsaturated group to co-reactive functional group A and preferably contains up to 34, preferably up to 18, more preferably up to 10, carbon and, optionally, oxygen and nitrogen atoms and, when $R^2$ is not a single bond, is preferably selected from

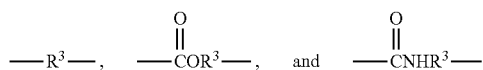

wherein $R^3$ is an alkylene group having 1 to 6 carbon atoms, a 5- or 6-membered cycloalkylene group having 5 to 10 carbon atoms, or an alkylene-oxyalkylene in which each alkylene includes 1 to 6 carbon atoms or is a divalent aromatic group having 6 to 16 carbon atoms; and A is a co-reactive functional group capable of reacting with pendent hydroxyl group of the oligomer for the incorporation of a free-radically polymerizable functional group.

An alternate but direct method of incorporation of the pendent ethylenically unsaturated group is to include a polyethylenically unsaturated monomer (such as ethylene glycol diacrylate, propylene glycol dimethacrylate, trimethylolpropane triacrylate, or 1,6-hexamethylenedioldiacrylate in the monomer mix. However, it has been determined that the use of such polyethylenically unsaturated monomers leads to extensive branching and/or crosslinking, and is therefore precluded in favor of the indirect method of functionalizing a portion of the pendent hydroxyl groups. Preferably, the curable composition contains no polyethylenically unsaturated monomer or other crosslinking agents.

The oligomer is prepared and then subsequently functionalized with the pendent, ethylenically unsaturated group. That is, the acrylic ester monomer, hydroxyl functional monomer and optional other polar monomer combined and polymerized to produce the hydroxyl functional oligomer.

The reactive oligomer may be prepared using radical polymerization techniques by combining an initiator and monomers in the presence of a chain transfer agent. In this reaction, a chain transfer agent transfers the active site on one growing chain to anther molecule that can then start a new chain so the degree of polymerization may be controlled. The $M_w$ of the reactive oligomer is 5 to 30 K, preferably 8 to 15 k. It has been found if the degree of polymerization is too high, the composition is too high in viscosity, and not easily processable. Conversely, if the degree of polymerization is too low, the modulus, adhesion and other mechanical properties are diminished (at a constant degree of functionalization).

Chain transfer agents may be used when polymerizing the monomers described herein to control the molecular weight of the resulting reactive and non-reactive oligomers. Suitable chain transfer agents include halogenated hydrocarbons (e.g., carbon tetrabromide) and sulfur compounds (e.g., lauryl mercaptan, butyl mercaptan, ethanethiol, and 2-mercaptoethyl ether, isooctyl thioglycolate, t-dodecylmercaptan, 3-mercapto-1,2-propanediol), and ethyleneglycol bisthioglycolate. The amount of chain transfer agent that is useful depends upon the desired molecular weight of the oligomer and the type of chain transfer agent. The chain transfer agent is typically used in amounts from about 0.1 parts to about 10 parts; preferably 0.1 to about 8 parts; and more preferably from about 0.5 parts to about 4 parts based on total weight of the monomers used in the preparation of the oligomers.

The curable composition further comprises a diluent monomer component that may be the same monomers described supra for the reactive oligomer. Up to 50, preferably up to 20, more preferably up to 10, parts by weight of diluent monomer may be added such that the composition comprises less than 50 wt. % of the diluent solvent monomer component and greater than 50 wt. % of the solute reactive oligomer.

In some embodiments the diluent monomer component comprises:
80 to 100 parts by weight of (meth)acrylate ester monomers and/or hydroxy-functional monomers;
0 to 30 parts by weight of polar monomers;
0 to 10 parts by weight of silyl functional monomers, wherein the sum of the monomer is 100 parts by weight.

In some embodiments the curable composition comprises (meth)acrylate ester monomers and hydroxy-functional monomers (hydroxyalkyl (meth)acrylates) in weight ratios of 5:95 to 9.5:5.

The solvent monomer component generally contains no multifunctional acrylates capable of crosslinking.

In some embodiments the hydroxyl-functional monomer is used in amounts such the curable composition (reactive oligomer+non-reactive oligomer+solvent monomer diluent) has a hydroxyl content greater than $8.3 \times 10^{-4}$ mol OH/g.

The curable composition further comprises a (meth)acryloyl non-reactive oligomer having a $T_g \geq 20°$ C., preferably $T_g \geq 30°$ C., and a $M_w$ of 1-30 k, preferably 3-10 k. By "non-reactive" it is meant the oligomer contains no pendent ethylenically unsaturated polymerizable groups. In essence, the non-reactive oligomer is a dead polymer that does not polymerize with either the reactive solute oligomer or the solvent monomers in the curable syrup.

The non-reactive oligomer comprises:
80 to 100 parts by weight of (meth)acrylate ester monomers and/or hydroxy-functional monomers;
0 to 30 parts by weight of polar monomers;
0 to 10 parts by weight of silyl functional monomers, wherein the sum of the monomer is 100 parts by weight.

In some embodiments the curable composition comprises (meth)acrylate ester monomers and hydroxy-functional monomers (hydroxyalkyl (meth)acrylates) in weight ratios of 5:95 to 95, preferably 50:50 to 95:5.

To provide the $T_g$, it is desirable for the non-reactive oligomer to include a high $T_g$ monomer, having a $T_g$ of at least 25° C., and preferably at least 50° C. Suitable high $T_g$ monomers include Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The non-reactive oligomer may be prepared using radical polymerization techniques by combining an initiator and monomers in the presence of a chain transfer agent, similar to the preparation of the reactive oligomer. Alternatively the non-reactive oligomer may be prepared by an adiabatic process as described herein The curable composition comprises 1 to about 20 parts; preferably 1 parts to about 10 parts, more preferably 1-5 parts of a non-reactive oligomer, based on 100 parts by weight of the total monomers plus reactive oligomer (a)+(b).

The curable composition comprises less than 50 wt. % of the diluent monomers and, greater than 50 wt. % of the solute reactive oligomer plus non-reactive oligomer, and a photoinitiator in concentrations ranging from about 0.001 to about 5.0 pbw, preferably from about 0.001 to about 1.0 pbw, and more preferably from about 0.01 to about 0.5 pbw, per 100 pbw of the monomers.

The reactive and non-reactive oligomers, and solvent monomers are combined and oligomerized in the presence of a photoinitiator. More particularly, the adhesive is prepared by the steps of:
(i) providing an essentially solvent-free mixture comprising the free radically polymerizable monomers supra and at least one free-radical polymerization initiator,
(ii) partially polymerizing said mixture to provide a partially polymerized mixture exhibiting a Brookfield viscosity of between 1,000 and 125,000 mPas at 20° C. and a degree of conversion of monomers to polymer of between 85-99 wt. %, preferably 90 to 98 wt. % with respect to the mass of the monomers prior to polymerization to produce the precursor to the reactive oligomer.
(iii) converting a portion of the hydroxyl functional monomer units of the oligomer to pendent polymerizable (meth) acrylate groups to produce the reactive oligomer,
(iv) adding one or more photoinitiators, the non-reactive oligomer and solvent diluent monomers to the partially polymerized mixture (comprising the oligomer) to provide a radiation-curable precursor,
(v) subsequently applying the radiation-curable precursor to a substrate, and
(vi) further polymerizing the radiation-curable precursor by subjecting it to actinic irradiation to provide said adhesive.

The present disclosure further relates to a radiation-curable precursor obtainable by performing steps (i)-(v) of the method of the present disclosure. The polymer obtained by conversion of the monomers to polymer to a degree of between 85-99 wt. % which is comprised in the radiation-curable precursor, preferably has a polydispersity $\rho = M_w/M_n$ between 1.5 and 4.

The mixture further comprises an effective amount of one or more free-radical polymerization initiators. The free-radical polymerization initiators and their amount and the polymerization conditions are selected to effect a partial polymerization of the mixture providing the required conversion of monomers to polymer to a degree of between 85-99 wt. % with respect to the mass of the monomers prior to polymerization, and a viscosity of the partially polymerized mixture of between 1,000-500,000 mPas at 20° C. The term "free-radical polymerization initiators" as used above and below includes initiators which can be thermally activated or activated by actinic radiation such as, in particular, UV-radiation.

Since the mixture preferably is partially prepolymerized in step (ii) under essentially adiabatic polymerization conditions, the mixture preferably comprises one or more thermally activatable free-radical polymerization initiators. Suitable thermally activatable free-radical polymerization initiators include organic peroxides, organic hydroperoxides, and azo-group initiators which produce free-radicals. Useful organic peroxides include but are not limited to compounds such as benzoyl peroxide, di-t-amyl peroxide, t-butyl peroxy benzoate, and di-cumyl peroxide. Useful organic hydroperoxides include but are not limited to compounds such as t-amyl hydroperoxide and t-butyl hydroperoxide. Useful azo-group initiators include but are not limited to the Vazo™ (compounds manufactured by DuPont, such as Vazo™52 (2,2'-azobis(2,4-dimethylpentanenitrile)), Vazo™64 (2,2'-azobis(2-methyl-propanenitrile)), Vazo™67 (2,2'-azobis(2-methylbutanenitrile)), and Vazo™88 (2,2'-azobis(cyclohexane-carbonitrile)).

The polymerization steps (ii) and (iii) may occur as a single step, or multiple steps. That is, all or a portion of the monomers and/or the initiator may be initially charged and partially polymerized. In some embodiments, there is an initial charge of monomers and initiator that is partially polymerized, then additional monomer and/or initiator is added, then further polymerized. Such multiple polymerization steps 1) helps narrow the polydispersity of the reaction, specifically reducing the amount of low molecular weight chains formed and 2) minimize the heat of reaction and 3) allows one to adjust the type and amount of monomer available during polymerization.

The term "essentially adiabatic polymerization" as used above and below means that total of the absolute value of any energy exchanged to or from the reaction system in which the polymerization of the mixture to a desired degree of conversion to provide the partially polymerized mixture, takes place, will be less than about 15% of the total energy liberated during said polymerization of the mixture.

In the preferred method of the present disclosure, the reaction system in which the adiabatic polymerization of the mixture to a degree of conversion of monomers to polymer between 85-99 wt. % to provide the partially cured mixture takes place, preferably is a batch reactor. By reacting batch-wise is meant that the polymerization reaction of the mixture occurs in a vessel where the partially cured mixture may be drained from the vessel at the end of the polymerization and not continuously during the reaction. The monomers and initiators and, optionally, additives can be charged to the vessel at one time prior to reacting, in steps over time while reacting, or continuously over a time period while reacting, and the polymerization reaction is allowed to proceed for the necessary amount of time to achieve the desired degree of conversions of said one or more monomers to polymer to a degree of between 85-99 wt. %.

The degree of conversion can be measured by standard analytical methods, including IR spectroscopy and gravimetric analysis. Additional details regarding the adiabatic reaction process may be found in U.S. Pat. No. 7,691,437 (Ellis et al.), incorporated herein by reference.

The oligomer produced from step (ii) has the general formula:

$$\sim[M^{Ester}]_a\text{-}[M^{OH}]_b\text{-}[M^{Polar}]_c\text{-}[M^{Silyl}]_e\sim, \text{ where}$$

-[$M^{Ester}$]- represents interpolymerized (meth)acrylate ester monomer units;
-[$M^{OH}$]- represents interpolymerized (meth)acryloyl monomer units having a pendent hydroxy group,
[$M^{Polar}$] represent optional polar monomer units; and
[$M^{Silyl}$] represent optional silane-functional monomer units.

Subscripts a, b, c and e represent the parts by weight of each monomer unit, as described. It will be understood that the oligomeric product of the adiabatic process further comprises unreacted monomer due to the partial conversion.

As previously described, a portion of the hydroxyl functional monomer units -[$M^{OH}$]—, are converted to [$M^{Acryl}$] (meth)acryloyl monomer units having a pendent polymerizable (meth)acryloyl group in step (iii) to yield a reactive oligomer of the formula:

$$\sim[M^{Ester}]_a\text{-}[M^{OH}]_{b*}\text{-}[M^{Polar}]_c\text{-}[M^{Acryl}]_e\sim, \text{ where}$$

[$M^{Acryl}$] represents interpolymerized (meth)acryloyl monomer units having a pendent polymerizable (meth)acryloyl group, b* represents the parts by weight of the hydroxyl-functional monomer remaining after functionalization to produce [$M^{Acryl}$] and d represents the parts by weigh of the monomer units having pendent, free radically polymerizable monomer units. It will be apparent that b*+d will equal the value of b in the starting oligomer. A percent of the pendent hydroxyl groups are functionalized with (meth)acrylate groups to provide the oligomer with 1 to 10 wt. % of (meth)acrylate groups for subsequent polymerization. Post-functionalization, it is preferred that the oligomer comprises at least 10 wt. %, preferably at least 15 wt. % and most preferably at least 20 wt. %, of the hydroxyl functional monomer units so as to avoid the cloud point problems in humid environments.

In the fourth step (iv), the non-reactive oligomer, solvent monomers and photoinitiator(s) are added to the partially polymerized reactive oligomer mixture to provide the radiation-curable precursor. The term "photoinitiator" as used above and below comprises free-radical polymerization initiators which can be activated by some kind of actinic radiation such as for example, light sources, especially UV-light sources, or e-beam sources. Activation by light sources and, especially, UV-light sources is preferred. Free-radical radiation polymerization initiators which can be activated by light, are often referred to as free-radical photoinitiators. Radiation-curable precursors which include one or more photoinitiators are preferred. The free-radical photoinitiators which are suitable preferably include both type I and type II photoinitiators.

Type I photoinitiators are defined to essentially undergo a unimolecular bond cleavage reaction upon irradiation thereby yielding free-radicals. Suitable type I photoinitiators are selected from a group consisting of benzoin ethers, benzil ketals, α-dialkoxyacetophenones, α-hydroxyalkyl-phenones and acylphosphine oxides. Suitable type I photoinitiators are commercially available, for example, as Esacure™ KIP 100 from Lamberti Spa, Gallarate, or as Irgacure™ 651 from Ciba-Geigy, Lautertal, Germany.

Type II photoinitiators are defined to essentially undergo a bimolecular reaction where the photoinitiators interact in an excited state with a second compound acting as co-initiator, to generate free-radicals. Suitable type II photoinitiators are selected from a group comprising benzophenones, thioxanthones and titanocenes. Suitable co-initiators are preferably selected from a group comprising amine functional monomers, oligomers or polymers whereby amino functional monomers and oligomers are preferred. Both primary, secondary and tertiary amines can be used whereby tertiary amines are preferred. Suitable type II photoinitiators are commercially available, for example, as Esacure™ TZT from Lamberti Spa., Gallarate, Italy, or as 2- or 3-methyl-benzophenone from Aldrich Co., Milwaukee, Wis. Suitable amine co-initiators are commercially available, for example, as GENOMER™ 5275 from Rahn AG, Zurich, Switzerland.

Photoinitiators may be used in the liquid compositions when curing with UV-radiation. Photoinitiators for free radical curing include organic peroxides, azo compounds, quinines, nitro compounds, acyl halides, hydrazones, mercapto compounds, pyrylium compounds, imidazoles, chlorotriazines, benzoin, benzoin alkyl ethers, ketones, phenones, and the like. For example, the adhesive compositions may comprise ethyl-2,4,6-trimethylbenzoylphenylphosphinate available as LUCIRIN™ TPO-L from BASF Corp. or 1-hydroxycyclohexyl phenyl ketone available as IRGACURE™ 184 from Ciba Specialty Chemicals.

The total amount of photoinitiators and, optionally, of one or more co-initiators typically is in the range of about 0.001 wt. % to about 5 wt. % and preferably in the range of about 0.1 wt. % to about 3 wt. % with respect to the mass of the curable composition.

The radiation-curable precursor (oligomer and diluent) has a Brookfield viscosity of between 1,000 to 500,000 mPas, preferably of between 2,000 and 125,000 mPas, more preferably between 2,000 to 75,000 and especially preferably of between 2,000 and 50,000 mPas at 20° C. If the radiation-curable composition is applied to a substrate by printing it preferably has a Brookfield viscosity at 20° C. of between 1,000 and 30,000 mPas and more preferably between 2,000 and 25,000 mPas.

The curable composition comprising the reactive and non-reactive oligomers, diluent monomer(s) and photoinitiator is thoroughly mixed and subsequently applied to a substrate in the fourth and fifth steps. Because of its low viscosity the composition can be applied to a substrate by conventional coating methods such as knife-coating, gravure coating, curtain coating, air knife coating and roll-coating. In some embodiments the curable composition is applied by dispensing a fixed amount of adhesive over the bonding area. This may be applied by applying dots and/or lines via a needle, needle die or slot die. The entire area may be coated by spray coating, die coating, draw bar coating or curtain coating. A "dam and fill" method may be used, precuring a dam of composition around the perimeter of the bonding area and then filling the bonding area using any of the methods described above. The dam may also be in the form of a tape, or a foam and/or rubber gasket. The area may be coated using stencil printing or screen printing without the aid of a dam. Additional information regarding these deposition methods may be found in US 20130011683, US 20130034713, U.S. Pat. No. 8,468,712 and U.S. 20090283211, incorporated herein by reference.

Subsequent to its application to a substrate the precursor is further polymerized in step (v) by subjecting it to actinic irradiation and preferably to UV-irradiation. Actinic radiation from any source and of any type can be used for the curing of the composition whereby light sources are preferred over e-beam sources. The light can be in the form of parallel rays or divergent beams. Since many photoinitiators generating free-radicals exhibit their absorption maximum in the ultraviolet (UV) range, the light source is preferably selected to emit an effective amount of such radiation. Suitable light sources include carbon arc lamps, mercury vapor lamps, fluorescent lamps comprising ultraviolet light-emitting phosphors, ultraviolet light-emitting diodes, argon glow lamps and photographic flood lamps. Preferred are high-intensity light sources having a lamp power density of at least 80 mW/cm$^2$ and more preferably of at least 120 mW/cm$^2$.

When subjecting the curable composition to actinic irradiation and, in particular, to UV-irradiation, the precursor is cured via a free-radical polymerization mechanism. The composition is termed as "fully cured" when the conversion of the oligomer and diluents monomers to polymer is at least 90%, more preferably at least 95%, especially preferably at least 97.5% and most preferably at least 99%.

The energy density applied preferably is 100-5,000 mJ/cm$^2$ and more preferably 300-3000 mJ/cm$^2$ for curing a 250 μm thick layer of the radiation-curable composition.

The curable composition and the photoinitiator may be irradiated with activating UV radiation to polymerize the monomer component(s). UV light sources can be of two types: 1) relatively low light intensity sources such as Blacklights which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably 15 to 450 mW/cm$^2$ or Fusion bulbs that provide up to about 4000 mW/m$^2$.

Further components and additives may be included into the curable composition such as, for example, heat stabilizers, antioxidants, antistatic agents, thickeners, fillers, pigments, dyes, colorants, thixotropic agents, processing aides, nanoparticles, fibers and any combination thereof in amounts such that the optical properties of the adhesive are not significantly compromised. Such additives are generally in an amount of between 0.01 and 10 wt. % and more preferably in an amount of between 0.05 and 5 wt. % with respect to the mass of curable composition. In some embodiment the curable composition and subsequent adhesive contain no such additives.

In some embodiments the curable composition may further comprise metal oxide particles, e.g silica and zirconia, to modify the refractive index of the adhesive layer or the viscosity of the liquid adhesive. Metal oxide particles that are substantially transparent may be used. Metal oxide particles may be used in an amount needed to produce the desired effect, for example, in an amount from about 1 to about 10 weight percent, from about 3.5 to about 7 weight percent, from about 10 to about 85 weight percent, or from about 40 to about 85 weight percent, based on the total weight of the curable composition. Metal oxide particles may only be added to the extent that they do not add undesirable color, haze or transmission characteristics. Generally, the particles can have an average particle size of from about 1 nm to about 100 nm.

The metal oxide particles can be surface treated to improve dispersibility in the adhesive layer and the composition from which the layer is coated. Examples of surface treatment chemistries include silanes, siloxanes, carboxylic acids, phosphoric acids, zirconates, titanates, and the like. Techniques for applying such surface treatment chemistries are known.

In some embodiments, the adhesive layer comprises a fumed silica. Suitable fumed silicas include, but are not limited to: AEROSIL™ 200; AEROSIL™ R805; and EVONIK™ VP NKC 130 (both available from Evonik Industries): CAB-O-SIL™ TS 610; and CAB-O-SIL™ T 5720 (both available from Cabot Corp.), and HDK™ H20RH (available from Wacker Chemie AG). In some embodiments, the adhesive layer comprises a fumed aluminum oxide, such as AEROXIDE™ ALU 130 (available from Evonik, Parsippany, N.J.). In some embodiments, the adhesive layer comprises clay such as GARAMITE™ 1958 (available from Southern Clay Products).

In some embodiments, the composition comprises non-reactive oligomeric rheology modifiers. While not wishing to be bound by theory, non-reactive oligomeric rheology modifiers build viscosity at low shear rates through hydrogen bonding or other self-associating mechanisms. Examples of suitable non-reactive oligomeric rheology modifiers include, but are not limited to: polyhydroxycarboxylic acid amides (such as BYK 405, available from Byk-Chemie GmbH, Wesel, Germany), polyhydroxycarboxylic acid esters (such as BYK R-606™, available from Byk-Chemie GmbH, Wesel, Germany), modified areas (such as DISPARLON 6100™, DISPARLON 6200™ or DISPARLON 6500™ from King Industries, Norwalk, Conn. or BYK 410™ from Byk-Chemie GmbH, Wesel, Germany), metal sulfonates (such gas K-STAY™ 501 from King Industries, Norwalk, Conn. or IRCOGEL 903™ from Lubrizol Advanced Materials, Cleveland, Ohio), acrylated oligoamines (such as GENOMER 5275™ from Rahn USA Corp, Aurora, Ill.), polyacrylic acids (such as CARBOPOL 1620™ from Lubrizol Advanced Materials, Cleveland, Ohio), modified urethanes (such as K-STAY 740™ from King Industries, Norwalk, Conn.), micronized amide waxes (such as CRAYVALLAC SLT™ from Arkema), micronized amide modified castor oil was (such as CRAYVALLAC MT™ from Arkema), micronized castor oil derived waxes (such as CRAYVALLAC ANTISETTLE CVP™ from Arkema), pre-activated amide wax dispersed in (meth)acrylate monomers (such as CRAYVALLAC E00054) or polyamides. In some embodiments, non-reactive oligomeric rheology modifiers are chosen to be miscible and compatible with the optically clear adhesive to limit phase separation and minimize haze.

In some embodiments, the adhesive layer may be formed from a thixotropic liquid optically clear adhesive. As used herein, a composition is considered thixotropic if the composition shear thins, i.e., viscosity decreases when the composition is subjected to a shearing stress over a given period of time with subsequent recovery or partial recovery of viscosity when the shearing stress is decreased or removed. Such adhesives exhibit little or no flow under zero or near-zero stress conditions. The advantage of the thixotropic property is that the adhesive can be dispensed easily by such processes as needle dispensing due to the rapid decrease in viscosity under high shear rate conditions. Adhesive compositions can be made thixotropic by adding particles to the compositions. In some embodiments, fumed silica is added to impart thixotropic properties to a liquid adhesive, in an amount of from about 2 to about 10 wt. %, or from about 3.5 to about 7 wt. %.

The efficiency of the thixotropic agent and the optical properties depend on the composition and its action with the thixotropic agent. For example, in the case of associative thixotropes or hydrophilic silica, the presence of highly polar monomers such as acrylic acid, monomers or oligomers may disrupt the thixotropic or optical performance. Consequently, it is preferred that the curable composition contain no acid-functional monomers or oligomers.

In some embodiments, any liquid optically clear adhesive having a viscosity of no more than 30 Pa·s, between about 2 and about 30 Pa·s and particularly between about 5 and about 20 Pa·s at a shear rate of 1 to 10 sec$^{-1}$ can be combined with a thixotropic agent to form a thixotropic liquid optically clear adhesive suitable for stencil printing or screen printing. The efficiency of the thixotropic agent and the optical properties depend on the composition of the liquid optically clear adhesive and its interaction with the thixotropic agent. For example, in the case of associative thixotropes or hydrophilic silica, the presence of highly polar monomers such as acrylic acid, acid or hydroxyl containing monomers or oligomers may disrupt the thixotropic or optical performance.

The curable composition optionally comprises a plasticizer that increases its softness and flexibility to the resultant adhesive. Plasticizers are well known and typically do not participate in polymerization of (meth)acrylate groups. The plasticizer may comprise more than one plasticizer material. The adhesive may comprise from greater than 1 to about 20 weight percent, or from greater than 3 to about 15 weight percent, of the plasticizer. The particular plasticizer used, as well as the amount used, may depend on a variety of factors.

The curable composition may comprise a tackifier. Tackifiers are well known and are used to increase the tack or other properties of an adhesive. There are many different types of tackifiers but nearly any tackifier can be classified as: a rosin resin derived from wood rosin, gum rosin or tall oil rosin; a hydrocarbon resin made from a petroleum-based feedstock; or a terpene resin derived from terpene feedstocks of wood or certain fruits. The adhesive layer may comprise, e.g., from 0.01 to about 20 weight percent, from 0.01 to about 15 weight percent, or from 0.01 to about 10 weight percent of tackifier. The adhesive layer may be free of tackifier.

The adhesive resulting from photopolymerization of the curable composition is desirably optically clear. As used herein, the term "optically clear" refers to a material that has a luminous transmission of greater than about 90 percent, a haze of less than about 2 percent, and opacity of less than about 1 percent in the 350 to 800 nm wavelength range. Both the luminous transmission and the haze can be determined using, for example, ASTM-D 1003-95. Typically, the optically clear adhesive may be visually free of bubbles.

The adhesive layer desirably maintains optical clarity, bond strength, and resistance to delamination over the lifetime of the article in which it is used. Whether to adhesive will likely have these desirable characteristics can be determined using an accelerated aging test. The adhesive layer can be positioned between substrates for this test. The resulting laminate is then exposed to elevated temperatures, optionally, combined with elevated humidity conditions, for a period of time. For example, the adhesive layer can often retain its optical clarity after aging at 85° C. for approximately 500 hours without humidity control (i.e., the relative humidity in the oven is usually below about 10 percent or below about 20 percent). Alternatively, the adhesive can often retain its optical clarity after aging at 65° C. for approximately 72 hours with a relative humidity of about 90 percent. Most importantly, the cloud point resistant adhesive can often retain its optical clarity after aging at 65° C. for approximately 72 hours with a relative humidity of about 90 percent and rapid (i.e. within minutes) cooling to ambient conditions. After aging, the average transmission of the adhesive between 350 nanometers (nm) and 800 nm can be greater than about 85 percent and the haze can be less than about 2 percent.

The adhesive resulting from photopolymerization of the curable composition desirably has a shear modulus of 5000 to 1,000,000, preferably 5000 to 100,000, more preferably 5000 to 50,000 Pascals.

Laminates are provided that include an optical film or optically clear substrate and a optically clear adhesive layer adjacent to at least one major surface of the optical film or substrate. The articles can further include another substrate (e.g., permanently or temporarily attached to the adhesive layer), another adhesive layer, or a combination thereof. As used herein, the term "adjacent" can be used to refer to two layers that are in direct contact or that are separated by one or more thin layers, such as primer or hard coating. Often, adjacent layers are in direct contact. Additionally, laminates are provided that include an adhesive layer positioned between two substrates, wherein at least one of the substrates is an optical film. Optical films intentionally enhance, manipulate, control, maintain, transmit, reflect, refract, absorb, retard, or otherwise alter light that impinges upon a surface of the film. Films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and an anti-reflective films, and the like. Films for the provided laminates can also include retarder plates such as quarter-wave and half-wave phase retardation optical elements. Other optically clear films include anti-splinter films and electromagnetic interference filters.

In some embodiments, the resulting laminates can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, glazing (e.g., windows and windshields), screens or displays, cathode ray tubes, and reflectors.

Exemplary optically clear substrates include, but are not limited to a display panel, such as liquid crystal display, an OLED display, a touch panel, electrowetting display or a cathode ray tube, a window or glazing, an optical component such as a reflector, polarizer, diffraction grating, mirror, or cover lens, another film such as a decorative film or another optical film.

Representative examples of optically clear substrates include glass and polymeric substrates including those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes, polypropylenes, and cellulose triacetates. Typically, cover lenses can be made of glass, polymethyl methacrylates, or polycarbonate.

The laminates have at least one of the following properties: the adhesive layer has optical transmissivity over a useful lifetime of the article, the adhesive can maintain sufficient bond strength between layers of the article, the adhesive can resist or avoid delamination, and the adhesive can resist bubbling of the adhesive layer over a useful lifetime. The resistance to bubble formation and retention of optical transmissivity can be evaluated using accelerated aging tests.

The adhesive compositions of the present disclosure may be applied directly to one or both sides of an optical element such as a polarizer. The polarizer may include additional layers such as an anti-glare layer, a protective layer, a reflective layer, a phase retardation layer, wide-angle compensation layer, and a brightness enhancing layer. In some embodiments, the adhesives of the present disclosure may be applied to one or both sides of a liquid crystal cell. It may also be used to adhere a polarizer to a liquid crystal cell. Yet another exemplary set of optical laminates include the application of a cover lens to a LCD panel, the application of a touch panel to an LCD panel, the application of a cover lens to a touch panel, or combinations thereof.

EXAMPLES

Materials

| Abbreviation or Trade Name | Description |
|---|---|
| TDA | Tridecyl Acrylate, available under the trade designation "SR489D" from Sartomer USA, LLC, Exton, Pennsylvania. |
| 2-HPA | 2-hydroxypropyl acrylate available from BASF Corporation, Florham Park, New Jersey. |
| IEM | Isocyanatoethyl methacrylate, available from Showa Denko, Kanagawa, Japan. |
| 2-HPMA | 2-hydroxypropyl methacrylate, available from Alfa Aesar, Heysham England. |
| IBOA | Isobornyl Acrylate, available under the trade designation "SR506A" from Sartomer USA. |
| IOTG | Isooctyl thiolglycolate, available under the trade designation "IO7870" from Pfaltz & Bauer, Waterbury, Connecticut. |
| EGBTG | Ethylene glycol bisthioglycolate (95%) available under the trade designation "E09020" from Pfaltz & Bauer, Waterbury, Connecticut. |
| VAZO 52 | 2,2'-Azobis(2,4-dimethylpentanenitrile), available under the trade designation "VAZO 52" from E. I. du Pont de Nemours and Co., Wilmington, Delaware. |
| VAZO 88 | 1,1'-Azobis(cyanocyclohexane), available under the trade designation "VAZO 88" from E. I. du Pont de Nemours and Co. |
| L130 | 2,5-Dimethyl-2,5-di-(tert-butylperoxy)hexyne-3, available under the trade designation "Lupersol 130" from Pennwalt Corporation, Buffalo, New York. |
| TPO-L | Ethyl(2,4,6-trimethylbenzoyl) phenylphosphinate, available under the trade designation "Lucirin TPO-L" from BASF Corporation, Florham Park, New Jersey. |
| A174 | 3-methacyrloxypropyltrimethoxysilane, available under the trade designation "Silquest A-174" from Momentive, Columbus, Ohio. |
| IRG 1076 | Octadecyl-3-(3,5-di-tert.butyl-4-hydroxyphenyl)-propionate, a phenolic primary antioxidant available under the trade designation "IRGANOX 1076" from BASF Corporation, Houston, Texas. |
| AO503 | Di(tridecyl) 3,3'-thiodipropionate available under the trade designation "ADK STABILIZER AO-503 from Adeka Corporation, Tokyo, Japan. |

Test Methods

Viscosity Measurement 1

Viscosity measurements were made by using an AR2000 Rheometer equipped with a 40 mm, 1° stainless steel cone and a plate from TA Instruments, New Castle, Del. Viscosities were measured at 25° C. using a peak hold flow procedure with a frequency of 1 sec$^{-1}$ and a duration of one minute with a 28 µm gap between the cone and the plate. Viscosity values are reported in pascal seconds (Pa·s) at a shear rate of 1 sec$^{-1}$.

Viscosity Measurement 2

Viscosity measurements were made by using an AR2000 Rheometer equipped with a 40 mm, 1° stainless steel cone and a plate from TA Instruments, New Castle, Del. Viscosities were measured at 25° C. using a steady state flow procedure with a frequency sweep from 0.001 to 100 sec$^{-1}$ over 15 minutes with a 28 µm gap between the cone and the plate. Viscosity values are reported in Pascal seconds (Pa·s) at a shear rate of 1 sec$^{-1}$.

Molecular Weight Determination

The molecular weight distribution of the compounds was characterized using conventional gel permeation chromatography (GPC). The GPC instrumentation, which was obtained from Waters Corporation, Milford, Mass., included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns available from Varian Inc, Palo Alto, Calif.

Samples of polymeric solutions were prepared by dissolving polymer or dried polymer samples in tetrahydrofuran at a concentration of 0.5 percent (weight/volume) and filtering through a 0.2 micron polytetrafluoroethylene filter that is available from VWR International, West Chester, Pa. The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight (Mw) were calculated for each sample against this standard calibration curve.

Pluck Adhesion

Two float glass slides, 2¼ inch (5.72 cm)×1 3/16 inch (4.60 cm)×¼ inch (0.635 cm) were exposed to UV light. Under UV light, one side of the float glass glowed less than the other. The side that glowed less was designated as the first side. The first side of each float glass slide was cleaned with isopropyl alcohol (IPA). Two layers of SCOTCH Filament Tape 898, available from the 3M Company, St. Paul, Minn., were attached along the edges of the first side of the first float glass slide, in order to control the thickness of the adhesive composition, once it was placed on the slide. The tape created a step height of about 340 microns. The adhesive composition was dispensed by a syringe in the center of the first slide, within the region enclosed by the tape. The first side of the second float glass slide was then slowly brought into contact with the first slide, such that it made contact with the adhesive composition. The second glass slide was then pressed down to obtain the desired thickness of the adhesive, about 275 microns. The adhesive composition between the slides was cured with a total energy of about 3,000 mJ/cm$^2$ in UV-A with a Fusion UV lamp, available under the trade designation "LIGHT HAMMER-10 MARK2" from Fusion UV Systems Inc., Gaithersburg, Md., using a quartz UV-D bulb. Samples then dwelled for one day in a controlled temperature-humidity (CTH) room at a temperature of 74° F. (23.3° C.) and a relative humidity of 50% prior to testing.

A glass slide with cured adhesive was loaded into a sliding pluck fixture on an MTS INSIGHT Electromechanical Test System with a 30 kN load cell available from MTS Systems Corporation, Eden Prairie, Minn. The samples were pulled apart at 25 mm/min and tested to failure. The first measured peak load was then divided by the measured area of the adhesive composition on the pluck sample to determine the pluck adhesion, measured in N/cm². At least three samples were tested for each adhesive composition, with an average value for pluck adhesion reported.

Peel Adhesion

A float glass slide, 5 inch (12.7 cm)×2 inch (5.1 cm)×⅛ inch (0.318 cm) was exposed to UV light. Under UV light, one side of the float glass glowed less than the other. The side that glowed less was designated as the first side. The first side of the float glass slide was cleaned with isopropyl alcohol (IPA). Two layers of SCOTCH Filament Tape 898 were attached along the edges of the first side of the float glass slide, in order to control the thickness of the adhesive composition. A line of liquid adhesive composition was applied on the first side of the first glass slide, within the region enclosed by the tape. An anodized aluminum tape, with anodized aluminum side facing up, was laid on a large glass plate. The adhesive was sandwiched between the glass slide and the anodized aluminum side of the aluminum tape by flipping the glass slide over and bringing the adhesive into contact with the surface of the aluminum tape. The glass slide was then pressed down to obtain the desired thickness of the adhesive. The adhesive composition was cured through the float glass slide with a total energy of about 3,000 mJ/cm² in UV-A with a Fusion UV lamp, available under the trade designation "LIGHT HAMMER-10 MARK2" from Fusion UV Systems Inc, using a quartz UV-D bulb. The peel sample was removed from the glass plate and cut into a 1 cm wide strip. Excess aluminum and adhesive was removed/cleaned from the glass slide and the sample was tested on IMASS peel tester, available from IMASS, Inc., Accord, Mass., using a 4 second delay, 20 second test time and a 6 cm/s peel rate. The data was reported in newton per cm (N/cm).

Optical Measurements

Optical properties of the adhesive compositions were measured by sandwiching the adhesive composition between two 2 inch (5.08 cm)×3 inch (7.62 cm)×200 microns LCD glass panels. EAGLE 2000 available from Specialty Glass Products, Willow Grove, Pa. The thickness of the adhesive composition was controlled to about 275 microns by applying SCOTCH Filament Tape 898, 3M Company, along the two, along the edges of one of the panels. The adhesive composition was cured with a total energy of about 3,000 mJ/cm² in UV-A with a Fusion UV lamp, available under the trade designation "LIGHT HAMMER-10 MARK2" from Fusion UV Systems Inc., Gaithersburg, Md., using a quartz UV-D bulb. Haze, transmission and color of the cured LOCAs were measured before and after aging under environmental testing conditions using a HunterLab UltraScan PRO available from Hunter Associates Laboratory, Inc, Reston, Va. Samples then dwelled for one day in a controlled temperature-humidity (CTH) room at a temperature of 74° F. (23.3° C.) and a relative humidity of 50%, prior to testing.

Preparation of Reactive Oligomer (RO) and Non-Reactive Oligomer (NRO)

324.0 g of TDA, 76.0 g of 2-HPA, and 12.0 g of IOTG were added to a four neck flask equipped with a reflux condenser, thermocouple, mechanical stirrer, and a gas inlet that allows both nitrogen and air to be bubbled into the solution. The first charge of thermal initiators, Vazo 52 (0.02 g), Vazo 88 (0.02 g), and L130 (0.03 g), were added to the flask. The mixture was stirred and heated to 60° C. under nitrogen. During the polymerization, the temperature of the reaction mixture quickly exothermed and peaked at about 150° C. After the reaction peak, the vessel was cooled to about 100° C. and a second charge of Vazo 88 (0.02 g) dissolved in an additional 3 grams of TDA and 1 gram of 2-HPA was added to the flask. The reaction vessel was heated and held at 160° C. for 90 minutes under a nitrogen atmosphere, before cooling to 90° C. and purging with air. 16.0 g IEM was then added to the vessel to react with the pendant hydroxyl groups on the TDA/HPA oligomer chains, incorporating methacrylate functional groups into the polymer. The reactor vessel was held at 90° C. for 3 hours under an air atmosphere and then cooled and drained, producing reactive oligomer 1 (RO-1). A sample was taken at the end of this reaction period for weight average molecular weight (Mw) determination by GPC. The result shown in Table 1.

A second reactive oligomer (RO-2) and two non-reactive oligomers (NRO-1 and NRO-2, respetivley) were prepared using the procedure described for RO-1, except the formulation were changed. The formulation for RO-2, NRO-1 and NRO-2 are shown in Table 1, along with the corresponding Mw data. For the non-reactive oligomers, the addition of IEM and subsequent heating at 90° C. for 3 hours was not conducted.

TABLE 1

| Material | RO-1 | RO-2 | NRO-1 | NRO-2 |
|---|---|---|---|---|
| TDA (g) | 324.0 | 320.0 | 88.0 | 24.0 |
| IBOA (g) | — | — | 236.0 | 300.0 |
| 2-HPA (g) | 76.0 | — | 80.0 | — |
| 2-HPMA (g) | — | 80.0 | — | 76.0 |
| EGBTG (g) | — | 14.0 | — | — |
| IOTG (g) | 12.0 | — | 13.6 | 16.0 |
| VAZO 52 (g) | 0.02 | 0.018 | 0.02 | 0.018 |
| VAZO 88 (g) | 0.04 | 0.036 | 0.04 | 0.036 |
| L130 (g) | 0.03 | 0.018 | 0.03 | 0.018 |
| IEM (g) | 16.0 | 12.0 | — | — |
| Mw (Dal) | 14,300 | 8,570 | 5,610 | 6,140 |

Example 1-Example 4

The adhesive composition of Examples 1-4 (see Table 2 for the specific formulations) were prepared by charging the components of a given formulation into a white mixing container, from FlackTek Inc., Landrum, S.C. The container was capped and placed in a metal box placed on a roller equipped with Dayton DC Speed Control. The mixing container was then heated overnight at a temperature of about 60° C. using an IR-heating lamp, while rotating the metal box at about 6 rpm. Next, the adhesive composition was mixed with a Hauschild SPEEDMIXER DAC 150 FVZ available from FlackTek Inc., operating at 3,540 rpm for 6 minutes. The adhesive composition was transferred into a 30 cc black colored syringe, available from Nordson EFD LLC, Fast Providence, R.I., and centrifuged for 5 min at 3,500 rcf (relative centrifugal force) in a centrifuge available under the trade designation HERAEUS LABOFUGE 400 from Thermo Scientific of Thermo Fischer Scientific Inc., Waltham, Mass.

Example 5-Example 7

The adhesive composition of Examples 5-7 (see Table 2 for the specific formulations) were prepared by charging the RO and NRO of a given formulation into a glass jar at 120°

C. and mixing with a magnetic stir bar until RO and NRO became miscible. After the glass jar had cooled down, the remaining components of the formulation were charged into the same glass jar and kept mixing for one hour at 120° C. was transferred to mixing cups and mixed with and mixed with a Hauschild SPEEDMIXER DAC 150 FVZ, from FlackTek Inc., operating at 3,540 rpm for 3 minutes. The adhesive composition was transferred into a 30 cc black colored syringe, available from Nordson EFD LLC, and centrifuged for 5 min at 3,500 rcf in a centrifuge available under the trade designation HERAEUS LABOFUGE 400 available from Thermo Scientific of Thermo Fischer Scientific Inc.

Comparative Example 8 (CE-8) and Comparative Example 9 (CE-9)

CE-8 and CE-9 (see Table 2 for the specific formulations) were prepared using the procedure described for Example 1-Example 4.

TABLE 2

| Material | Example 1 | Example 2 | Example 3 | Example 4 | Example 5 | Example 6 | Example 7 | CE-8 | CE-9 |
|---|---|---|---|---|---|---|---|---|---|
| RO-1 (g) | 23.328 | 22.648 | 22.025 | 14.601 | — | — | — | 24.039 | — |
| RO-2 (g) | — | — | — | — | 38.460 | 38.458 | 38.460 | — | 25.640 |
| NRO-1 (g) | 0.667 | 1.332 | 2.020 | 1.838 | — | — | — | — | — |
| NRO-2 (g) | | | | | 0.440 | 1.128 | 2.260 | — | — |
| AO5039 (g) | 0.267 | 0.274 | 0.275 | 0.184 | 0.449 | 0.453 | 0.456 | 0.274 | 0.300 |
| Irganox 1076 (g) | 0.269 | 0.275 | 0.268 | 0.185 | 0.440 | 0.448 | 0.456 | 0.278 | 0.301 |
| 2-HPA (g) | 1.798 | 1.798 | 1.796 | 1.238 | — | — | — | 1.807 | — |
| 2-HPMA (g) | — | — | — | — | 3.296 | 3.293 | 3.303 | — | 2.200 |
| TPO-L (g) | 0.278 | 0.266 | 0.272 | 0.181 | 0.438 | 0.450 | 0.447 | 0.285 | 0.300 |
| A174 (g) | 0.027 | 0.028 | 0.027 | 0.018 | 0.052 | 0.043 | 0.050 | 0.025 | 0.031 |

Using the various test methods described above, the optical properties, including L*, a*, b*, % haze and % transmission (% T), along with the peel adhesion, pluck adhesion and viscosity, were measure for Examples 1-7, CE-8 and CE-9. Results are shown in Table 3.

TABLE 3

| Parameter | Example 1 | Example 2 | Example 3 | Example 4 | Example 5 | Example 6 | Example 7 | CE-8 | CE-9 |
|---|---|---|---|---|---|---|---|---|---|
| L* | 96.7 | 96.8 | 96.8 | 96.7 | 96.8 | 96.7 | 96.8 | 96.8 | 96.8 |
| a* | −0.06 | −0.05 | −0.04 | −0.05 | −0.06 | −0.05 | −0.04 | −0.04 | −0.05 |
| b* | 0.42 | 0.32 | 0.32 | 0.33 | 0.31 | 0.29 | 0.28 | 0.31 | 0.29 |
| % Haze | 0.4 | 0.5 | 0.4 | 0.5 | 0.1 | 0.1 | 0.1 | 0.3 | 0.1 |
| % T | 90.9 | 91.2 | 91.3 | 91.2 | 91.2 | 91.2 | 91.3 | 91.3 | 91.3 |
| Peel Adhesion (N/cm) | 0.90 | 1.02 | 1.01 | 1.02 | 1.54 | 1.59 | 1.89 | 0.76 | 1.60 |
| Pluck Adhesion (N/cm²) | 146.3 | 148.6 | 129.1 | 118.8 | 139.2 | 139.9 | 144.9 | 161.6 | 139.9 |
| Viscosity (Pa · s) | 5.92* | 6.28* | 6.78* | 7.61* | 3.92** | 4.16** | 4.70** | 5.51* | 3.60** |

*Measured by Viscosity Measurement 1.
**Measured by Viscosity Measurement 2.

The invention claimed is:
1. A curable composition comprising:
a) a reactive solute (meth)acryloyl oligomer having a $M_w$ of 5 k to 30 k and a $T_g$ of <20° C. comprising:
   i. greater than 50 parts by weight of (meth)acrylate ester monomer units,
   ii. 10 to 49 parts by weight of hydroxyl-functional monomer units,
   iii. 1 to 10 parts by weight of monomer units having pendent acrylate groups,
   iv. 0 to 30 parts by weight of polar monomer units,
   v. 0 to 10 parts by weight of silane-functional monomer units,
   wherein the sum of the monomer units is 100 parts by weight;
b) a diluent monomer component;
c) a non-reactive (meth)acryloyl oligomer having a $M_w$ of 1 to 30 k, and
d) a photoinitiator.

2. The curable composition of claim 1 comprising less than 50 wt. % of the diluent monomer component and greater than 50 wt. % of the solute reactive oligomer and non-reactive oligomer (a+c).

3. The curable composition of claim 1, wherein the hydroxyl-functional monomer has the general formula:

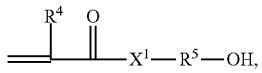

wherein
R$^5$ is a hydrocarbyl group;
R$^4$ is —H or C$_1$-C$_4$ alkyl; and
X$^1$ is —NR$^4$— or —O—.

4. The curable composition of claim 1 wherein the diluent monomer component comprises:
80 to 100 parts by weight of (meth)acrylate ester monomers and/or hydroxy-functional monomers (hydroxyalkyl (meth)acrylates);
0 to 30 parts by weight of polar monomers;
0 to 10 parts by weight of silane functional monomers, wherein the sum of the monomer of the diluent monomer component is 100 parts by weight.

5. The curable composition of claim 4 comprising:
(meth)acrylate ester monomers and hydroxy-functional monomers (hydroxyalkyl (meth)acrylates) in a weight ratio of 95:5 to 5:95.

6. The curable composition of claim 1 wherein the non-reactive oligomer comprises:
80 to 100 parts by weight of (meth)acrylate ester monomers and/or hydroxy-functional monomers (hydroxyalkyl (meth)acrylates);
0 to 20 parts by weight of polar monomers;
0 to 2 parts by weight of silane functional monomers, wherein the sum of the monomer of the diluent monomer component is 100 parts by weight.

7. The curable composition of claim 1 wherein the reactive oligomer is of the formula:

where

-[M$^{Ester}$]- represents interpolymerized (meth)acrylate ester monomer units;
-[M$^{OH}$]- represents interpolymerized (meth)acryloyl monomer units having a pendent hydroxy group,
[M$^{Polar}$]- represents interpolymerized polar monomer units; and
[M$^{Acryl}$] represents interpolymerized (meth)acryloyl monomer units having a pendent polymerizable (meth)acryloyl group;
[M$^{Silyl}$] represent optional silane-functional monomer
subscripts a, b*, c, d and represent the parts by weight of each monomer unit.

8. The curable composition of claim 1 further comprising metal oxide particles having an average particle size of 1 nm to 100 nm in amounts of 1 to 10 wt. %, relative to the total weight of the curable composition.

9. The curable composition of claim 1 wherein the hydroxyl-functional monomer is used in amounts such that the curable composition (reactive oligomer+non-reactive oligomer+diluent) has a hydroxyl content greater than 6.5× 10$^{-4}$ mol OH/g.

10. The curable composition of claim 1 wherein the composition comprises no crosslinking agents.

11. A cured adhesive composition prepared from the curable composition of claim 1.

12. An optically clear laminate comprising:
a first substrate having at least one major surface;
a second substrate having at least one major surface; and
the curable composition of claim 1 situated between and in contact with at least one major surface of the first substrate and at least one major surface of the second substrate.

13. An optically clear laminate according to claim 12, wherein the first substrate, the second substrate, or both the first substrate and the second substrate are selected from a display panel, a touch panel, an optical film, a cover lens, or window.

14. An optically clear laminate according to claim 13, wherein the display panel is selected from a liquid crystal display, a plasma display, an OLED display, an electrowetting display, and a cathode ray tube display.

15. An optically clear laminate according to claim 12, wherein the first and/or second substrate selected from a reflector, a polarizer, a mirror, an anti-glare or anti-reflective film, an anti-splinter film, a diffuser, or electromagnetic interference filter.

16. An optically clear laminate comprising:
a first substrate having at least one major surface;
a second substrate having at least one major surface; and
the cured adhesive composition of claim 11 disposed between and in contact with at least one major surface of the first substrate and at least one major surface of the second substrate.

17. The optically clear laminate of claim 16 wherein the adhesive has an average light transmission (over the range of 350-800 nm) greater than 85%, with thickness of 500 microns.

18. A method of preparing an adhesive comprising the steps of:
(i) providing the curable composition of claim 1,
(ii) partially polymerizing said composition to provide a partially polymerized mixture exhibiting a Brookfield viscosity of between 1,000 and 500,000 mPas at 20° C. and a degree of conversion of monomers to polymer of between 85-99 wt. %, with respect to the mass of the monomers prior to polymerization,
(iii) converting a portion of the hydroxyl functional monomer units of said oligomer to pendent polymerizable (meth)acrylate groups to produce a reactive oligomer,
(iv) adding one or more photoinitiators, non-reactive oligomers and solvent diluent monomers to the partially polymerized mixture to provide a radiation-curable composition,
(iv) subsequently coating the radiation-curable composition on a substrate, and
(v) further polymerizing the radiation-curable composition by subjecting it to actinic irradiation to provide said adhesive.

19. The method of claim 18 further comprising a tackifier.
20. The method of claim 18 further comprising a plasticizer.
21. The method of claim 18 further comprising a thixotropic agent.

* * * * *

UNITED STATES PATENT AND TRADEMARK OFFICE
CERTIFICATE OF CORRECTION

PATENT NO. : 10,035,328 B2
APPLICATION NO. : 15/034293
DATED : July 31, 2018
INVENTOR(S) : Jason Clapper et al.

It is certified that error appears in the above-identified patent and that said Letters Patent is hereby corrected as shown below:

Column 1,
Line 43, delete "$T_g<0+$" and insert -- $T_g<0°$ --, therefor.

Column 2,
Line 8, delete "a" and insert -- of --, therefor.

Column 5,
Line 45, before "than" insert -- greater --.
Line 49, delete "poly" and insert -- polymeric --, therefor.
Line 53, after "20," insert -- or --.

Column 6,
Line 7, delete "group." and insert -- groups. --, therefor.

Column 7,
Line 63, after "monomer" insert -- are --.

Column 8,
Line 2, delete "anther" and insert -- another --, therefor.
Line 45, delete "9.5:5." and insert -- 95:5. --, therefor.

Column 9,
Line 21, after "herein" insert -- . --.
Line 46, delete "oligomer." and insert -- oligomer, --, therefor.

Column 11,
Line 23, delete "~$[M^{Ester}]_a$-$[M^{OH}]_b$*-$[M^{Polar}]_c$-$[M^{Acryl}]_e$~," and insert
-- ~$[M^{Ester}]_a$-$[M^{OH}]_b$*-$[M^{Polar}]_c$-$[M^{Acryl}]_d$-$[M^{Silyl}]_e$~, --, therefor.

Signed and Sealed this
Second Day of October, 2018

Andrei Iancu
*Director of the United States Patent and Trademark Office*

CERTIFICATE OF CORRECTION (continued)
U.S. Pat. No. 10,035,328 B2

Column 14,
Line 1, delete "phosphoric" and insert -- phosphonic --, therefor.
Line 26, delete "areas" and insert -- ureas --, therefor.
Line 30, delete "gas" and insert -- as --, therefor.
Line 39, delete "was" and insert -- waxes --, therefor.
Line 66, delete "action" and insert -- interaction --, therefor.

Column 15,
Line 52, delete "to" and insert -- an --, therefor.
Line 55, after "between" insert -- two --.

Column 16,
Line 30, after "and" delete "an".

Column 17,
Line 8, after "layer," insert -- a --.

Column 19,
Line 41, delete "panels." and insert -- panels, --, therefor.

Column 20,
Line 15, after "result" insert -- is --.
Line 17, delete "respetivley)" and insert -- respectively) --, therefor.
Line 19, delete "formulation" and insert -- formulations --, therefor.
Line 57, delete "Fast" and insert -- East --, therefor.